(12) United States Patent
Skoglund

(10) Patent No.: US 6,387,983 B1
(45) Date of Patent: May 14, 2002

(54) FOUNDRY MIXES CONTAINING AN ALIPHATIC MERCAPTAN

(75) Inventor: Michael J. Skoglund, Dublin, OH (US)

(73) Assignee: Ashland Inc., Dublin, OH (US)

(*) Notice: Subject to any disclaimer, the term of this patent is extended or adjusted under 35 U.S.C. 154(b) by 0 days.

(21) Appl. No.: 09/575,916

(22) Filed: May 23, 2000

(51) Int. Cl.$^7$ ................................................ B22C 1/22
(52) U.S. Cl. ....................................... 523/146; 523/142
(58) Field of Search .............................. 523/142, 146; 524/714, 742, 745

(56) References Cited

U.S. PATENT DOCUMENTS

| | | | |
|---|---|---|---|
| 3,925,296 A | 12/1975 | Stone et al. ............ | 260/37 N |
| 4,311,620 A | 1/1982 | Sherwood et al. ............ | 260/9 |
| 4,753,825 A | 6/1988 | Linden et al. ............ | 427/340 |
| 4,803,245 A | * 2/1989 | Dammann ............ | 525/123 |
| 5,698,613 A | * 12/1997 | Jhaveri ............ | 523/139 |
| 5,849,864 A | * 12/1998 | Carlson et al. ............ | 528/55 |

FOREIGN PATENT DOCUMENTS

JP    01186236    7/1989

* cited by examiner

Primary Examiner—Edward J. Cain
Assistant Examiner—Katarzyna Wyrozebski-Lee
(74) Attorney, Agent, or Firm—David L. Hedden

(57) ABSTRACT

This invention relates to foundry mixes and their use in preparing foundry shapes (molds and cores) and in casting metals. The foundry mixes comprise a foundry aggregate and an organic foundry binder that contains an organic polyisocyanate and an aliphatic mercaptan. The binder systems react to form thiocarbamate polymers when mixed with sand. Preferably, a tertiary amine curing catalyst is used to promote the reaction of the organic polyisocyanate and aliphatic mercaptan.

13 Claims, No Drawings

FOUNDRY MIXES CONTAINING AN ALIPHATIC MERCAPTAN

FIELD OF THE INVENTION

This invention relates to foundry mixes and their use in preparing foundry shapes (molds and cores) and in casting metals. The foundry mixes comprise a foundry aggregate and an organic foundry binder that contains an organic polyisocyanate and an aliphatic mercaptan. The binder systems react to form thiocarbamate polymers when mixed with sand. Preferably, a tertiary amine curing catalyst is used to promote the reaction of the organic polyisocyanate and aliphatic mercaptan.

BACKGROUND OF THE INVENTION

In the foundry industry, one of the procedures used for making metal parts is "sand casting". In sand casting, disposable molds and cores are fabricated with a mixture of sand and an organic or inorganic binder. The foundry shapes are arranged in casting assembly, which results in a cavity through which molten metal will be poured. After the molten metal is poured into the assembly of molds and cores and cools, the metal part formed by the process is removed from the assembly. The binder prevents the molds and cores from disintegrating too rapidly when the hot molten metal is poured over them during the casting process.

Two of the prominent fabrication processes used in sand casting are the no-bake and the cold-box processes. In the no-bake process, a liquid curing catalyst is mixed with an aggregate and binder to form a foundry mix before shaping the mixture in a pattern. The foundry mix is shaped into a mold or core by placing it in a pattern, where it is cured until it is self-supporting and can be handled. In the cold-box process, a gaseous curing catalyst is passed through a shaped mixture (usually in a corebox) of the aggregate and binder to cure the mixture.

A binder commonly used in the cold-box fabrication process is a phenolic-urethane binder. The phenolic-urethane binder is mixed with an aggregate to form a foundry mix. The foundry mix is blown into pattern, typically a corebox, where it is cured by passing a gaseous tertiary amine catalyst through it. The phenolic-urethane binder consists of a phenolic resin component and polyisocyanate component. Phenolic-urethane binders are widely used in the foundry industry to bond the sand cores used in casting iron and aluminum. An example of a commonly used phenolic-urethane binder used in the cold-box process is disclosed in U.S. Pat. No. 3,409,575, which is hereby incorporated by reference. More recently amine curable cold-box binders based on acrylic-epoxy-isocyanate were developed, such as those shown in U.S. Pat. No. 5,880,175, which is hereby incorporated by reference. These cold-box processes are high production processes with short cycle times, i.e. typically less than one second.

After the metal has been cast, it is necessary to separate the sand mold and cores from the casting. One of the problems with using organic binders to form foundry shapes is that they can be too effective in binding the aggregate together. The result is that the foundry shapes are not readily separated from the metal part formed during the casting process. Consequently, time consuming and labor intensive means must be utilized to break down the binder so the metal part can be removed from the casting assembly. This is particularly a problem with internal cores, which are imbedded in the casting assembly and not easily removed.

Iron castings are made around 1500° C. Since a phenolic resin core binder undergoes thermal decomposition at this temperature, an internal core will decompose and can be readily removed from the casting. On the other hand, aluminum is cast at around 700° C. At this lower temperature, a phenolic resin core binder does not readily decompose, making complete removal of the internal core laborious. Since aluminum castings, as well as other light alloy castings, are used increasingly in place of iron as a means of reducing the weight of vehicle components, such as engine blocks and manifolds, there is a need to develop new methods of which facilitate the removal of internal cores.

One method of facilitating the removal of sand, used to make an internal core, from a large aluminum casting (e.g. an engine block) or a complex aluminum casting (e.g. a water pump housing), is by baking the casting in a forced air oven at a high temperature, typically for four to ten hours. Exposing the casting to the high temperature causes the binder to slowly decompose. This process is called "thermal core removal". This procedure reduces productivity and requires forced air ovens and large amounts of energy. Alternatively, some aluminum castings can be violently shaken until the internal core is released (mechanical core removal or "shakeout"). This procedure is inefficient and reduces productivity.

Another approach is shown in U.S. Pat. No. 4,293,480. This patent discloses a binder containing a modified isocyanate component that promotes better shakeout. On the other hand, U.S. Pat. No. 4,352,914 discloses a polyurethane binder with improved shakeout where the resin is modified.

It is also known to add simple compounds to phenolic urethane binders that will improve shakeout without affecting the stability of the binder. For instance, it is known to add polyester polyols ((U.S. Pat. No. 4,982,781) and polyether polyols (U.S. Pat. No. 5,132,339) to improve shakeout. The English translation of the abstract of Japanese Patent 57 050585 discloses the use of organosulfonic acids, as well as carboxylic acids, in amine-cured phenolic-urethane binders to improved shakeout, while the English translated abstract of Russian application SU 79-2844061 indicates that sodium salts of certain organosulfonic acids can improve the "knock-out" of foundry shapes made from certain inorganic binders.

Because of problems associated with the shakeout of foundry shapes made with phenolic urethane, other cold-box binder systems are often used for casting aluminum that provide good core removal. For example, furan cold-box resins display excellent core removal characteristics in aluminum casting. However, furan resin binders build a tar like residue on tooling. This requires frequent cleaning, higher tooling costs, and lowers foundry productivity. Thus, there is no "perfect" binder that provides the high productivity of a cold box binder system (e.g. instantaneous cure with a gas catalyst at room temperature) and facile thermal decomposition for rapid internal core removal when casting aluminum.

Binders for foundry aggregates based on organic polyisocyanates and thiophenols, cured with a volatile amine curing catalyst, are disclosed in U.S. Pat. No. 3,925,296 (Stone et al.). The advantage of the binder described in Stone is that the binder cures at low temperatures, or even room temperature. See column 1, lines 10–13 of the Stone patent. Stone does not disclose anything about improvements in casting and core removal. Aliphatic mercaptans are not disclosed in Stone and this patent indicates that an inert solvent is preferred or required.

SUMMARY OF THE INVENTION

The invention relates to a foundry mix comprising:
(1) a major amount of a foundry aggregate; and
(2) a minor amount of a foundry binder comprising:
   (a) an organic polyisocyanate; and
   (b) an effective amount of an aliphatic mercaptan,
where (a) and (b) are applied to a foundry aggregate as separate components or as a mixture.

Particularly preferred as (b) are polymercaptans. When the aggregate and binder are mixed, a thiocarbamate polymer is formed that holds the sand together in its shape. Preferably, a catalyst is used to promote the reaction of the organic polyisocyanate and aliphatic mercaptan. The preferred catalyst is a tertiary amine catalyst.

The invention also relates to a method of preparing a foundry shape, the shapes prepared, a method of making a metal casting, and metal castings prepared by this process. The foundry binders are particularly useful for preparing foundry shapes by the cold-box process using a volatile amine curing catalyst.

There are several advantages of using component (b) in the binder compositions, including the following:

1. When used in making foundry shapes, the binder undergoes accelerated thermal decomposition when the casting is baked to remove the internal cores. The binders show improvement in this respect when compared to commonly used phenolic urethane binders. Thus, foundry casting operations, bottlenecked by the need for the thermal sand removal of the mold from the casting, have increased productivity. The binders are particularly useful in making castings from aluminum because less capital investment for ovens and less energy is required.
2. The binders produce foundry shapes with adequate tensile strengths needed for use in casting metal parts.
3. The curing efficiency of the binder composition is better than that provided by similar compounds, which results in the use of lower amine catalyst.
4. The binders do not require solvents and phenolic resins. Therefore, when foundry cores are made with the binders, there is no solvent vapor and less smoke during casting.
5. The binder does not contain free phenol or formaldehyde.
6. Castings, which are made with foundry shapes that are held together with the binder, have good to excellent surface finish. Good surface finish is important because a pitted, discolored, rough, or porous surface results in scrap or requires machining, which requires labor and adds cost to the casting. It is surprising that a thiocarbamate binder, which exhibits the property of accelerated thermal breakdown, does not degrade so rapidly during the casting process that castings with surface defects are produced. A binder that has sufficient core-binding strength to result in aluminum castings with good surface finish, yet will degrade rapidly when subjected to high temperatures and permit internal cores to be readily be removed from the casting, is of great interest and benefit to foundries that cast metal parts.

BEST MODE AND OTHER EMBODIMENTS OF THE INVENTION

For purposes of describing this invention, an organic polyisocyanate includes diisocyanates. Examples of organic polyisocyanates that can be used in the binders have a functionality of two or more, preferably 2 to 5. The polyisocyanate may be aliphatic, cycloaliphatic, aromatic, or a hybrid polyisocyanate. Mixtures of such polyisocyanates may be used. Also, it is contemplated that capped polyisocyanates, prepolymers of polyisocyanates, and quasi prepolymers of polyisocyanates can be used.

Representative examples of polyisocyanates that can be used are aliphatic polyisocyanates such as polymeric hexamethylene diisocyanate, alicyclic polyisocyanates such as 4,4'-dicyclohexylmethane diisocyanate, and aromatic polyisocyanates such as 2,4' and 2,6-toluene diisocyanate, diphenylmethane diisocyanate, and dimethyl derivates thereof. Other examples of suitable polyisocyanates are 1,5-naphthalene diisocyanate, triphenylmethane triisocyanate, xylylene diisocyanate, and the methyl derivates thereof, polymethylenepolyphenyl isocyanates, chlorophenylene-2,4-diisocyanate, and the like. Polymeric hexamethylene diisocyanate and isophorone diisocyanate are the preferred polyisocyanates for providing the thermal sand removal performance.

The polyisocyanate is used in a liquid form. Solid or viscous polyisocyanate must be used in the form of organic solvent solutions, the solvent generally being present in a range of up to 80 percent by weight of the solution.

The other required component of the binder system is an aliphatic mercaptan. The term "mercaptan" means a compound having at least one "thio" (-SH) functional group. The term "mercaptan" includes polymercaptans, also known as polythiols, (mercaptans having more one thio functional group) and mercaptans having other functional groups that contain an active hydrogen atom.

Examples of suitable mercaptans include trimethylolpropane tris (3-mercaptopropionate, pentaerythitol tetrakis (3-mercaptopropionate), 2-mercaptoethyl ether, ethylenedioxydithiol, hexanedithiol, ethylene glycol bisthioglycolate, and ethylene glycol dimercaptopropionate. Ethylene glycol dimercaptopropionate and trimethylolpropane tris (3-mercaptopropionate) are the prefered mercaptans of this invention.

The organic polyisocyanate and mercaptan are used in sufficient concentrations to cause the curing of the binder when gassed with the curing catalyst. In general the ratio of the isocyanato groups of the polyisocyanate to the thio groups of the mercaptan is from 1.25:1 to 1:1.25, preferably about 1.1:1 to 1:1.1. In some cases, it may be desired to use an excess of either functionality to optimize a specific aspect of performance; i.e. an excess of isocyanato functionality might be used to enhance the humidity resistance of the foundry core.

The organic polyisocyanate and mercaptan can be added separately to the foundry aggregate or pre-mixed and added to the foundry aggregate, or they can be added to one or more of the reactive or non reactive components of the organic binder, in which they are compatible, before mixing with the aggregate. Preferably, the mercaptan is added to the organic polyisocyanate before the binder is mixed with the aggregate to form foundry mix.

Although foundry shapes can be made by shaping the foundry mix in a pattern and allowing it to cure spontaneously or in the presence of hot air without using a curing catalyst, it is preferred to use a curing catalyst. Although the reaction can be catalyzed with metal catalysts like dibutyltin diacetate and alkoxides (*J. Org Chem.* 32, 3938 (1967), strong bases are preferred as the curing catalyst. Thus, foundry shapes are preferably made with the binder by the no-bake or cold-box process. The no-bake process involves adding a liquid curing catalyst to the foundry mix, while the cold-box process involves blowing or ramming the foundry mix into a pattern where it is shaped, and then curing the foundry shape with a vaporous or gaseous catalyst.

Preferably, the no-bake process is carried in the manner as described in U.S. Pat. No. 3,676,392, which is hereby incorporated into this disclosure by reference. The liquid amine catalyst is a base having a $pK_b$ value generally in the range of about 7 to about 11. The term "liquid amine" is meant to include amines, which are liquid at ambient temperature or those in solid form, which are dissolved in appropriate solvents. The $pK_b$ value is the negative logarithm of the dissociation constant of the base and is a well-known measure of the basicity of a basic material. The higher this number is, the weaker the base. The bases falling within this range are generally organic compounds containing one or more nitrogen atoms. Specific examples of bases which have $pK_b$ values within the necessary range include 4-alkyl pyridines wherein the alkyl group has from one to four carbon atoms, isoquinoline, arylpyridines such as phenyl pyridine, pyridine, acridine, 2-methoxypyridine, pyridazine, 3-chloro pyridine, quinoline, N-methyl imidazole, N-ethyl imidazole, 4,4'-dipyridine, 4-phenylpropylpyridine, 1-methylbenzimidazole, and 1,4-thiazine. Preferably used as the liquid tertiary amine catalyst is an aliphatic tertiary amine, particularly [tris (3-dimethylamino) propylamine].

Preferably, the cold-box binder is cured by passing a tertiary amine gas, such as triethylamine, through the molded foundry shape in the manner as described in U.S. Pat. No. 3,409,579, which is hereby incorporated into this disclosure by reference. Typical gassing times are from 0.5 to 20.0 seconds, preferably from 0.5 to 6.0 seconds. Purge times are from 1.0 to 60 seconds, preferably from 1.0 to 20 seconds.

Various types of aggregate and amounts of binder are used to prepare foundry mixes by methods well known in the art. The preferred aggregate employed for preparing foundry mixes is sand wherein at least about 70 weight percent, and preferably at least about 85 weight percent, of the sand is silica. The amount of binder needed is an amount that is effective in producing a foundry shape that can be handled or is self-supporting after curing. In ordinary sand type foundry applications, the amount of binder is generally no greater than about 10% by weight and frequently within the range of about 0.5% to about 7% by weight based upon the weight of the aggregate. Most often, the binder content for ordinary sand foundry shapes ranges from about 0.6% to about 5% by weight based upon the weight of the aggregate in ordinary sand-type foundry shapes.

Optional ingredients, although not necessarily preferred, for the binder include polyols such as the benzylic ether phenolic resole resins described in U.S. Pat. No. 3,409,579, which is hereby incorporated by reference, solvents, release agents, benchlife extenders, and adhesion promoters to improve humidity resistance, e.g. silanes as described in U.S. Pat. No. 4,540,724 which is hereby incorporated by reference. These optional components can be added to the organic polyisocyanate, mercaptan, or used as a separate component as will be evident to one of ordinary skill in the art.

| ABBREVIATIONS | |
|---|---|
| bos | based on sand |
| GDP | ethylene glycol dimercaptopropionate |
| TMP | trimethylolpropane tris (3-mercaptopropionate) |
| HDI | a polymeric hexamethylene diisocyanate having viscosity of 1800–4000 cps, and a equivalent weight of 195 |
| IPDI | isophorone diisocyanate |

EXAMPLES

The examples will illustrate specific embodiments of the invention. These examples along with the written description will enable one skilled in the art to practice the invention. It is contemplated that many other embodiments of the invention will be operable besides these specifically disclosed. All parts are by weight and all temperatures are in ° C. unless otherwise specified.

In the examples, a generic ISOCURE® cold-box phenolic urethane binder was used for comparison purposes, and is designated as Comparative Binder A in the Examples. The formulation for this binder is given in the Table A:

TABLE A

ISOCURE ® BINDER FORMULATION (COMPARATIVE BINDER A)

| PART I 50 (pbw) PHENOLIC RESIN COMPONENT (pbw) | | PART II 50 (pbw) POLYISOCYANATE COMPONENT (pbw) | |
|---|---|---|---|
| Benzylic ether phenolic resin | 64.0 | MDI | 72.0 |
| Ester Solvent | 16.0 | Aromatic Solvent | 17.0 |
| Aromatic solvent | 20.0 | Kerosene | 10.4 |
| | | Benchlife extender | 0.6 |

This binder is used in aluminum casting at a Part I/Part II ratio of 50/50. The binders of Examples 1–2 used HDI as the organic polyisocyanate, while Example 3 used IPDI. The mercaptan and the amount used in the binders is set forth in Table I, where the amounts are based upon 100 parts of binder (mercaptan and organic polyisocyanate).

TABLE I (Mercaptan Component of the Binder Systems of Examples 1–3)

| EXAMPLE | MERCAPTAN | PBW |
|---|---|---|
| 1 | GDP | 38 |
| 2 | TMP | 42 |
| 3 | TMP | 55 |

The foundry binders were used to make foundry cores by the cold-box process using triethylamine (TEA) as the volatile tertiary amine catalyst. The binder (1.0 weight percent bos) was mixed with Wedron 540 silica sand. With respect to Binder A, the Part I was first mixed with the sand, and then the Part II was added. With respect to the binders of Examples 1–3, the mercaptan and HDI were first mixed and then added to the sand.

The resulting foundry mixes were forced into a by blowing it into the corebox and then contacted with TEA (triethylamine) at 20 psi for 1 seconds, followed by a 6 second nitrogen purge at 40 psi, thereby forming AFS tensile strength samples (dog bones) or 1"×1"×8" test bars.

The temperature of the constant temperature room (CT) was 25° C. and the relative humidity was 50%. The dog bones and test bars were stored in the CT room before testing. The tensile strengths of the dog bone test cores were measured on a Thwing Albert Intellect II instrument. Tensile strengths were measured on "fresh sand", and sand aged 3 hours and 5 hours after mixing (benchlife of the foundry mix). The tensile strengths of the dogbone test cores were measure at various time intervals after curing with TEA, e.g. 30 seconds, 5 minutes, 1 hour, 24 hours after curing, and 24 hours after curing while being exposed to a relative humidity of 90%. The results of the measurements are set forth in Table II.

TABLE II

Tensile Strength Profiles of Cores Made with the Binders

| | Tensile Strength lbs/in$^2$ | | | |
|---|---|---|---|---|
| Time elapsed | Binder A | Example 1 | Example 2 | Example 3 |
| Zero Bench | | | | |
| 30 sec | 88 | 78 | 67 | 112 |
| 5 min | 145 | 125 | 130 | 61 |
| 1 hr | 141 | 176 | 132 | 96 |
| 24 hr | 115 | 165 | 121 | 177 |
| 24 hr 90% RH | 35 | 111 | 58 | 72 |

Example 1 using TM/IPDM showed improved tensile profile. Although cores made with the other binders containing the mercaptan did not show improved overall tensile strengths when compared to the cores made with binder A, they did show improvement when the cores were exposed to 90% humidity for 24 hours. (See bolded row of Table II.) This improvement is quite significant, particularly for foundries that operate in climates where there is high humidity. Additionally, there are other advantages to using the binders, as shown in the experiments related to shakeout and casting.

A Thermal Sand Removal (TSR) test was used to simulate the removal of an internal sand core. The thermal sand removal was determined by first recording the weight of the 1"×1"×8" test bar, and then wrapping the bar in heavy duty aluminum foil (12"×12" sheet) and recording the weight of the wrapped bar. One end of the bar was left open and exposed to the air. The bar was heated in a Lindberg 11-MT-182418-21AM "Treet-All" box furnace at 500° C. for 4 hours and cooled to near room temperature. After time intervals of 2, 3, and 4 hours, loose sand was removed from the wrapped bar by inverting it to allow only the free loose sand to pour out of the open end. The wrapped bar was then weighed to determine the weight percent of the loose, free flowing sand that was removed from the bar. The results are set forth in Table III.

TABLE III

Thermal Sand Removal (TSR) Tests

| | TSR (wt %/time) | | | |
|---|---|---|---|---|
| Binder (1.0% BOS) | 1 hr | 2 hrs | 3 hrs | 4 hrs |
| Binder A | 1 | 13 | 27 | 40 |
| Example 1 | 1 | 46 | 100 | 100 |
| Example 2 | 1 | 41 | 85 | 100 |
| Example 3 | 2 | NA | 100 | 100 |

The data in Table III clearly show that the test bars made from the binders of Examples 1–3, containing a mercaptan, result in much better TSR than the test bars made from the comparative commercial binder.

Curing efficiency of the binder was measured by conducting bulk cure tests. Bulk cure is the method used for determining the curing efficiency of a binder with a given catalyst, or for comparing the curing efficiency of related catalysts relative to a given binder. In order measure bulk cure, a foundry mix is prepared with a binder and sand. The mix is loaded into a chamber, gassed with the catalyst, and the curing efficiency is calculated on the basis of the amount of the catalyst consumed for the particular binder. The specific test used the cold-box binder of the Comparative Binder and the binder of Example 1, with triethylamine (TEA) as the catalyst. The bulk cure tests were performed at about 66° C. with a known amount of TEA (triethylamine), a known amount of binder level (1.0 wt %), and 2400 grams of Wedron 540 sand with a Part I to Part II binder weight ratio of 55:45. The results are set forth in Table IV.

TABLE IV

COMPARISON OF BULK CURE RESULTS FOR BINDERS MADE WITH MODIFIED AND UNMODIFIED POLYISOCYANATE

| Example | TEA µl | BULK CURE RATE |
|---|---|---|
| Binder A | 1.00 | 41% |
| Example 1 | 0.25 | 99% |

These tests indicate that the binder of Example 1 cure more efficiently than the binder containing the Comparative binder. The bulk cure efficiency is estimated to be eight times that of Comparative Binder A.

The result is that less binder can be used to obtain the properties needed in the cores and molds produced. This results in cost savings and less stress on the environment.

Castings were produced using cores made from the Comparative Binder A and the binder of Examples 1 and 3. Wedron 540 sand as the aggregate. Aluminum metal was poured at about 775° C. around 2"×2" cylindrical cores made with Comparative Binder A and the binders of Example 1 and 3 to form aluminum test castings. The amount of binder used to make the cores was 1.0% based on the sand.

The castings were evaluated with respect to surface finish by making a 2×2 test casting, which is a modification of a design used by Murton and Gertsman for the investigation of metal penetration. After the metal is poured and cooled, the casting is observed and graded with respect to surface finish.

The casting results are shown in Table V. Table V indicates that the castings, made with cores using the binders of Examples 1 and 3 showed good to excellent surface finish and was similar to the Comparative binder.

TABLE V

CASTING TESTS RESULTS

| Binder | Surface Finish* |
|---|---|
| A | 1 |
| 1 | 2 |
| 3 | 1 |

*Casting Grade: 1 = Excellent, 2 = Good, 3 = Fair, 4 = Poor, 5 = Very Poor

I claim:
1. A foundry mix consisting essentially of:
 (A) a major amount of a foundry aggregate; and
 (B) a minor amount of a foundry binder comprising:
  (a) an organic polyisocyanate; and
  (b) an aliphatic mercaptan in an amount effective to accelerate thermal decomposition of cores and/or molds made from the binder,
where (a) and (b) are applied to a foundry aggregate as separate components or as a mixture.

2. The foundry mix composition of claim 1 wherein (b) is selected from the group consisting of trimethylolpropane tris (3-mercaptopropionate, pentaerythitol tertrakis (3-mercaptopropionate), 2-mercaptoethyl ether, ethylenedioxydithiol, hexanedithiol, ethylene glycol bisthioglycolate, and ethylene glycol dimercaptopropionate, and mixtures thereof.

3. The foundry mix composition of claim 2 wherein the ratio of the isocyanato groups of the polyisocyanate to the thio groups of the mercaptan is about 1.1:1.0 to 1.0:1.1.

4. The foundry mix of claim 3 wherein the organic polyisocyanate is an aliphatic polyisocyanate.

5. The foundry mix of claim 4 wherein the organic polyisocyanate is selected from the group consisting of hexamethylene diisocyanate, isophorone diisocyanate, and mixtures thereof.

6. The foundry mix of claim 4 wherein mercaptan is ethylene glycol dimercaptopropionate.

7. A process for casting a non ferrous metal part which comprises:

(A) introducing a foundry mix of claim 1, 2, 3, 4, 5, or 6 into a pattern to prepare an uncured foundry shape;

(B) allowing said foundry shape resulting from (A) to cure until said shape becomes handleable;

(C) removing said foundry shape from the pattern;

(D) inserting the foundry shape of claim 11 into a casting assembly;

(E) pouring a non ferrous metal, while in the liquid state, into said casting assembly;

(F) allowing said metal to cool and solidify; and (G) then separating the non ferrous metal part from the casting assembly.

8. The process of claim 7 wherein the non ferrous metal is aluminum.

9. The process of claim 7 wherein the ratio of the isocyanato groups of the polyisocyanate to the thio groups of the mercaptan of the foundry mix used to prepare the foundry shape is from 1.25:1 to 1:1.25.

10. The process of claim 7 wherein the foundry mix contains a liquid curing catalyst.

11. The process of claim 7 wherein the uncured foundry shape of (A) is contacting with a vaporous curing catalyst.

12. The process of claim 10 wherein the liquid curing catalysts is a tertiary amine.

13. The process of claim 11 wherein the vaporous curing catalyst is a tertiary amine.

\* \* \* \* \*